(12) United States Patent
Williams

(10) Patent No.: US 6,394,656 B1
(45) Date of Patent: May 28, 2002

(54) RETAINERLESS PRECESSING ROLLER BEARING

(75) Inventor: Steven S. Williams, Naperville, IL (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/654,628

(22) Filed: Sep. 5, 2000

(51) Int. Cl.⁷ .............................................. F16C 19/00
(52) U.S. Cl. ...................................................... 384/450
(58) Field of Search ................................ 384/450, 456, 384/548, 568, 569

(56) References Cited

U.S. PATENT DOCUMENTS

| | | |
|---|---|---|
| 1,914,548 A | 6/1933 | Wingquist |
| 2,387,962 A | 10/1945 | Williams |
| 2,586,406 A | 2/1952 | Wallgren |
| 2,767,037 A | 10/1956 | Williams |
| 3,046,066 A | 7/1962 | Lobeck et al. |
| 3,912,346 A | 10/1975 | Boratynski et al. |
| 3,930,693 A | 1/1976 | Bowen |
| 3,934,957 A | 1/1976 | Derner |
| 3,936,102 A | 2/1976 | Riegler et al. |
| 3,938,865 A | 2/1976 | Rouverol |
| 3,953,142 A | 4/1976 | Price et al. .................. 403/371 |
| 3,963,285 A | 6/1976 | Kellstrom |
| 4,120,542 A | 10/1978 | Bhateja et al. |
| 4,138,170 A | 2/1979 | Markfelder et al. |
| 4,139,317 A | 2/1979 | Hafner ......................... 403/352 |
| 4,492,415 A | 1/1985 | Balle et al. .................. 384/463 |
| 4,557,613 A | 12/1985 | Tallian et al. ............... 384/568 |
| 4,705,411 A | 11/1987 | Kellstrom .................... 384/450 |
| 4,714,358 A | 12/1987 | Bayer et al. ................ 384/470 |
| 5,000,587 A | 3/1991 | Hawley ....................... 384/558 |
| 5,037,214 A | 8/1991 | Dougherty ................... 384/571 |
| 5,074,680 A | 12/1991 | Hoch et al. ................. 384/560 |
| 5,269,609 A | 12/1993 | Holtz et al. ................. 384/623 |
| 5,290,374 A | 3/1994 | Holtz et al. ................. 148/559 |
| 5,413,416 A | 5/1995 | Grunze et al. .............. 384/572 |
| 5,437,209 A * | 8/1995 | Santoro ....................... 384/558 |
| 5,441,351 A | 8/1995 | Grunze et al. .............. 384/568 |
| 5,582,483 A | 12/1996 | Grunze et al. .............. 384/572 |
| 5,667,312 A | 9/1997 | Grunze et al. .............. 384/450 |
| 6,132,097 A * | 10/2000 | Kellstrom ................... 384/450 |

FOREIGN PATENT DOCUMENTS

| | | |
|---|---|---|
| DE | 649528 | 8/1937 |
| DE | 3537243 | 4/1987 |
| GB | 747314 | 4/1956 |
| GB | 929146 | 6/1993 |
| JP | 60-188617 | 9/1985 |
| SU | 1521949 | 11/1989 .................. 384/551 |

OTHER PUBLICATIONS

SKF Industries, Inc., SKF Product Service Guide, pp. 77–78, published Jan. 1985.

Rollway Product Bulletin, "Nutating Roller Bearings", 1983.

For Design News by David J. Bak, "Nutating Bearing Offsets Oscillating Motion", pp. 126–127, 1984.

Rexnord Corporation, "Rexnord Aerospace Bearings", pp. A2, A3, A20–22, A32 and A33, published 1990.

* cited by examiner

Primary Examiner—Thomas R. Hannon
(74) Attorney, Agent, or Firm—Quarles & Brady LLP

(57) ABSTRACT

A retainerless angular contact antifriction bearing apparatus including an inner race member having a spheroidal inner race surface, an outer race member including a pair of convex outer race surfaces opposing the inner race surface, and a plurality of rollers arranged in axially oppositely inclined rows. Each roller includes a concave longitudinal profile having a radius of curvature greater than the radius of curvature of each of the spheroidal inner race surface and the associated convex outer race surface. The radial internal clearance between the roller and the race surfaces is no more than 0.002 inches.

6 Claims, 3 Drawing Sheets

RETAINERLESS PRECESSING ROLLER BEARING

CROSS-REFERENCE TO RELATED APPLICATIONS

Not Applicable

FIELD OF INVENTION

The invention relates generally to roller bearings, and more particularly to retainerless precessing roller bearings for use in rotary or oscillatory applications, such as for supporting rotating or oscillating shafts.

BACKGROUND

Known roller bearings include various means for guiding and positioning rollers. For example, self-aligning angular contact roller bearings are shown in U.S. Pat. No. 2,387,962 issued Oct. 30, 1945 and U.S. Pat. No. 2,767,037 issued Oct. 16, 1956. In each of those patents, the illustrated roller bearing includes an inner ring that provides a substantially spherical inner race surface, a pair of outer race surfaces having convex curvatures, and a pair of oppositely inclined rows of symmetrical hourglass-shaped rollers. Those roller bearings also include bearing cages or retainers to separate, guide and position the rollers in each row. An example of the above-described roller bearing is produced by Rexnord Corporation, Bearing Operation, Downers Grove, Ill., and has a Model No. DAS4-14A.

Japanese Patent No. 60-188617 illustrates a roller bearing having opposite rows of asymmetrical rollers and a center guide ring. The shape of the rollers and the center guide ring operate to guide and position the rollers in each row.

It is also known to provide integral collars or shoulders on the inner ring or the outer ring of a roller bearing to guide the rollers. An example of such a roller bearing is illustrated in U.S. Pat. No. 3,912,346 issued Oct. 14, 1975. In that roller bearing, an inner ring is provided with radially extending integral collars between which the rollers are confined.

The loads exerted on a bearing unit such as those described above are typically carried by the rollers in only one part of the unit at a time, that part being referred to as the "load zone." Especially where bearings are used in oscillatory applications, such as in aircraft flight control surfaces, it is desired that the rollers precess or index so that they are all cycled through the load zone. Cycling the rollers results in utilization of the entire race surface of each of the rollers to extend rolling contact fatigue life. Cycling the rollers also redistributes grease for improved lubrication of the bearing unit which in turn reduces fretting damage and improves the bearing unit's resistance to raceway corrosion. To cause such precessing or indexing of the rollers, it is known to use a retainer with skewed pockets. A known retainer has fingers or prongs inclined slightly to provide an imbalanced amount of skew to the rollers which causes the rollers to precess or index during oscillation of the bearing.

A disadvantage associated with the foregoing roller bearing units is the inclusion of a bearing cage, retainer, guide ring, integral collar, or the like. Such components are costly to produce and assemble as part of the bearing unit. Those components also occupy space within the bearing unit that could otherwise be used for additional rollers and/or additional lubricant.

A full complement self-aligning roller bearing without a retainer guide ring is disclosed in U.S. Pat. No. 5,441,351 and assigned to the assignee of the invention disclosed herein. Although the bearing disclosed in the '351 patent provides some skew control of the bearings, roller precession is less consistent than can be achieved with the use of a retainer having skewed pockets. Therefore, a need exists for a retainerless roller bearing having consistent roller precessing.

BRIEF SUMMARY OF THE INVENTION

The invention provides an improved retainerless roller bearing apparatus particularly suited for oscillatory service. Applicant has discovered that, surprisingly, consistent precessing in a bearing can be achieved in a retainerless roller bearing apparatus including axially inclined rollers disposed between inner and outer race surfaces by maintaining a radial internal clearance of no more than 0.002 inches between each roller and the inner and outer race surfaces. The races having the specified roller clearance controls the skew of the rollers to consistently precess the rollers in an oscillatory operation.

Applicant has observed that the bearing apparatus embodying the invention precesses or indexes to cycle the rollers through the load zone. The observed roller precession was greater (i.e., more consistent) than can be achieved with the use of a retainerless bearing, such as disclosed in U.S. Pat. No. 5,441,351.

In particular, the invention provides a retainerless bearing apparatus including an inner ring member having an arcuate inner race surface, an outer ring member having an arcuate outer race surface, and a row of rollers in the raceway space defined between the inner and outer race surfaces with a radial internal clearance of no more than 0.002 inches between each roller and the race surfaces.

In one embodiment, the retainerless bearing apparatus includes an inner race member having a spheroidal inner race surface, and an outer race member having a convex outer race surface opposing the inner race surface. The bearing apparatus also includes a plurality of rollers arranged in a row in the raceway space between the inner and outer race surfaces with a radial internal clearance of no more than 0.002 inches between the rollers and the race surfaces. Each of the rollers includes a concave longitudinal profile (i.e., is hourglass-shaped) having a radius of curvature that is somewhat greater than the radius of curvature of each of the convex outer race surface and the spheroidal inner race surface. Applicant has discovered that this relationship between the rollers and the race surfaces provides roller skew control for the bearing to consistently precess without a retainer, guide ring, collar, or other means apart from the primary race surfaces for holding, positioning or guiding the rollers.

This and still other objects and advantages of the present invention will be apparent from the description which follows. In the detailed description below, preferred embodiments of the invention will be described in reference to the accompanying drawings. These embodiments do not represent the fall scope of the invention. Rather the invention may be employed in other embodiments. Reference should therefore be made to the claims herein for interpreting the breadth of the invention.

Figure 1:
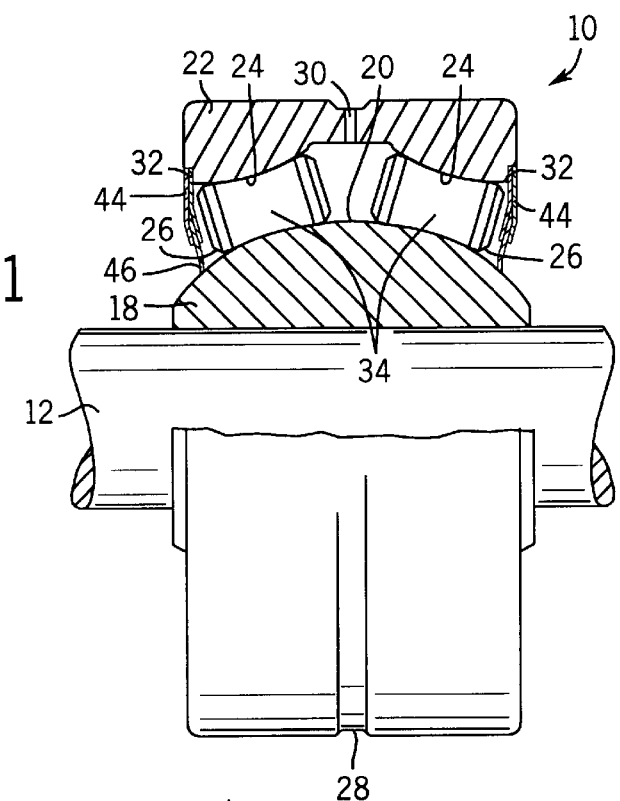
FIG. 1 is a side elevational view, partially broken away and in section, of a roller bearing apparatus shown supporting a shaft.

Before one embodiment of the invention is explained in detail, it is to be understood that the invention is not limited in its application to the details of construction and the arrangement of components set forth in the following description or illustrated in the drawings. The invention is capable of other embodiments of being practiced or being carried out in various ways. Also, it is to be understood that the phraseology and terminology used herein is for the purpose of description and should not be regarded as limiting.

DETAILED DESCRIPTION OF THE INVENTION

Illustrated in FIG. 1 is a roller bearing apparatus which embodies the invention and which is shown supporting a rotating or oscillating shaft 12. In the particular embodiment illustrated in the drawings, the bearing apparatus 10 is an angular contact internally self-aligning bearing.

The bearing apparatus 10 comprises an annular inner race or ring member 18 through which the shaft 12 extends. The inner ring member 18 includes an arcuate outer surface forming an inner bearing race surface 20. The inner race surface 20 is preferably substantially spheroidal and has (FIG. 2) a radius of curvature $R_i$. If desired, collars (not shown) can be secured on the opposite ends of the inner ring member 18 to provide misalignment stops and a surface for a seal to engage. A bearing apparatus including suitable collars is illustrated in aforementioned U.S. Pat. No. 2,767,037, the specification of which is herein incorporated by reference.

The roller bearing 10 also comprises an annular outer race or ring member 22 encircling the inner ring member 18. The outer ring member 22 includes at least one radially inwardly facing outer race surface. In the illustrated arrangement, the outer ring member 22 includes a pair of axially oppositely inclined arcuate outer race surfaces 24 each opposing the inner race surface 20 to provide a pair of raceway spaces 26. The outer race surfaces 24 are of generally convex curvature and each has (FIG. 2) a radius of curvature $R_o$ that is preferably substantially constant. The value of radius of curvature $R_o$ for both outer race surfaces 24 is preferably the same (within manufacturing tolerances) and, in the illustrated embodiment, is approximately equal to radius of curvature $R_i$.

To facilitate periodic lubrication of the bearing apparatus 10, an annular groove 28 is provided on the outer circumferential side of the outer ring member 22 and a hole 30 communicates between the groove 28 and the interior of the bearing apparatus 10. A desired lubricant can be injected into the groove 28 by suitable means such as a grease gun (not shown), as is described in U.S. Pat. No. 2,767,037. Although an annular groove is disclosed, an annular groove for periodic lubrication is not required, and in certain applications not preferred. Other means for lubricating the bearing apparatus can be used if desired, such as packing the rollers in grease, without departing from the scope of the present invention.

The roller bearing 10 also comprises a plurality of rollers 34. In the illustrated embodiment, the rollers 34 are arranged in the raceway spaces 26 in oppositely axially inclined annular rows. Each row includes up to a full complement of rollers 34 (i.e., maximum number of rollers that will fit in a row when no retainer or other structure intervenes between adjacent rollers). Since the bearing apparatus 10 is retainerless, as is further discussed below, each roller 34 is engageable with the adjacent rollers on its opposite sides, as well as with the inner race surface 20 and the associated one of the outer race surfaces 24. While the rollers 34 can have various configurations, in the illustrated arrangement the rollers are identical (within manufacturing tolerances), and each roller 34 has (FIG. 2) a longitudinal axis 36 and is symmetric about a plane which is perpendicular to the axis 36 and which includes a line 38 at the midpoint of the roller 34.

Figure 2:
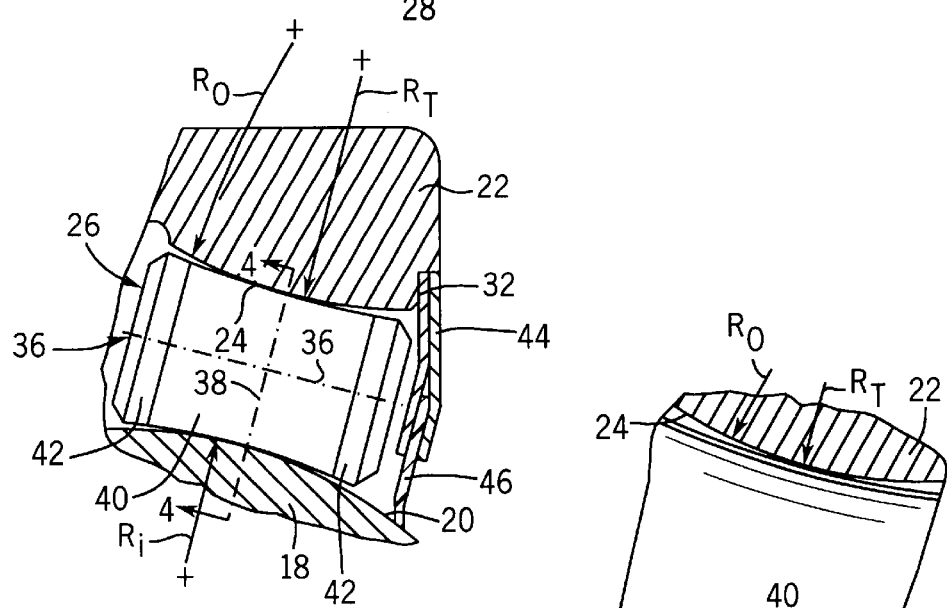
FIG. 2 is an enlarged view of a portion of the bearing apparatus illustrated in FIG. 1, and showing the roller depicted therein under loaded conditions.

As shown in FIG. 2, each roller 34 includes a midsection 40 with an arcuate outer surface having a concave longitudinal profile with a radius of curvature $R_r$ that is preferably constant. In the particular embodiment illustrated in the drawings, radius of curvature $R_r$ is greater than each of the radii $R_i$ and $R_o$. Each roller 34 also has opposite end portions 42 that are substantially cylindrical.

Since the bearing apparatus 10 does not include a retainer, guide ring, collars, etc., the inner race surface 20 and the outer race surfaces 24 serve as the sole means for holding and positioning the rollers 34 of each row within the corresponding raceway space 26. Additionally, since the inner race surface 20 is spheroidal and $R_i$ is less than $R_r$, sliding movement between the rollers 34 and the inner race surface 20 is substantially eliminated and pivotal movement of each roller 34 about its midpoint line 38 is at most minimally interfered with by the inner race surface 20. Therefore, such pivotal movement (i.e., skewing) is controlled substantially entirely by contact between the rollers 34 and the associated outer race surfaces 24.

Figure 3:
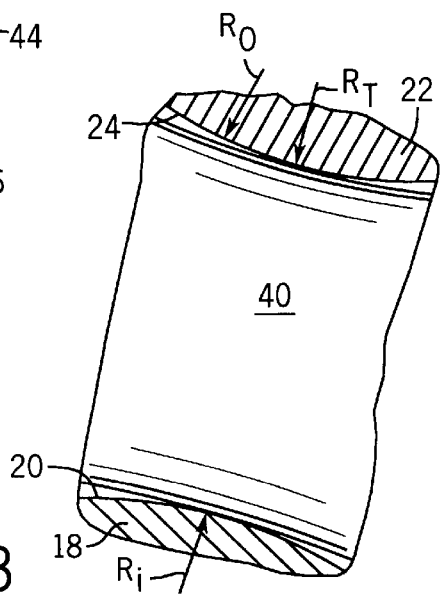
FIG. 3 is a further enlarged view of part of the bearing apparatus portion illustrated in FIG. 2, and showing the roller in a no-load condition wherein the line of contact between the roller and the race surfaces is substantially reduced.

In particular, under no load conditions (FIG. 3), substantially point contact exists between each of the rollers 34 and the associated outer race surface 24. Any pivotal movement by a roller 34 about its midpoint line 38 (skewing) results in development of a line of contact (see FIG. 2) between that roller and the associated outer race surface 24 which inhibits further skewing. If roller skew continues to increase the line of contact eventually reaches the end portions 42 of the hourglass-shaped rollers, which ends restrict any further skewing. Under loaded conditions, contact between the roller 34 and the associated outer race surface 24 and the inner race surface 20 is extended axially outwardly from the mid-point of the roller 34 due to material deflection as well as roller skewing. Although the effects of that relationship are not fully understood, it has been observed that substantial indexing or precessing of the rollers 34 is achieved when the bearing apparatus 10 is used in oscillatory applications. Additionally, tests have indicated substantial increases in load rating and bearing life as measured by cycles to failure relative to prior art bearings including retainers, this being primarily due to the increased number of rollers 34 over which the load is distributed.

In one particular embodiment of the invention having the concave rollers, for example, a full complement of sixteen rollers 34 each having a diameter (in end view) of about 0.4 inch are used in each row, although fewer rollers 34 could be used to accommodate additional lubricant, if desired. In that embodiment, $R_r$ is about 1.536 inches and about 0.015 inch greater than each of $R_i$ and $R_o$ (i.e., about 1% osculation or difference in curvature between the rollers and the inner and outer race surfaces). While optimum osculation values are not known, 1% osculation in combination with the tightened radial internal clearance is effective to achieve consistent roller control and guidance, and Applicant believes that osculation values up to about 4% may be employed.

Figure 4:
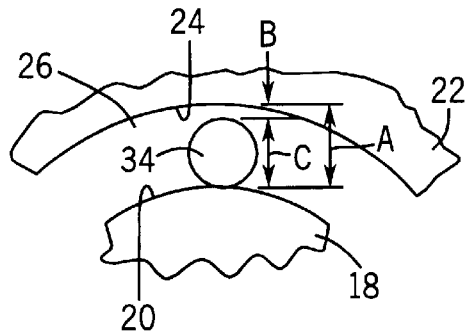
FIG. 4 is a sectional view along line 4—4 of FIG. 2.
Figure 5:
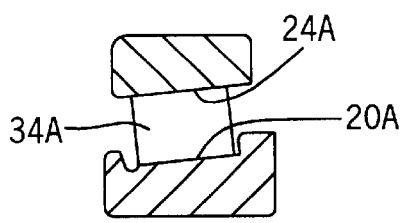
FIG. 5 is a sectional view of a bearing apparatus incorporating the present invention and having a single annular row of straight rollers.

Applicant has discovered that by maintaining a radial internal clearance of no more than 0.002 inches between each axially inclined roller 34 and the inner and outer race surfaces 20, 24, the cooperation of the rollers 34 with the outer race surfaces 24 controls the roller 34 skew to consistently precess the rollers 34 in an oscillatory operation. The radial internal clearance B is shown in FIG. 4 (not to scale), and defined as the difference between the radial height A of the raceway space 26 between the inner and outer race surfaces 20, 24 surfaces and the roller radius C. In the embodiment including concave rollers 34 which have a varying radius along the longitudinal length of the roller 34, the radial internal clearance B must be maintained only at the midpoint 40 of each roller 34. Providing a bearing having tighter tolerances than a 0.002 inch radial internal clearance requires greater precision in manufacturing which increases the bearing manufacturing costs, and is therefore taught away from in the prior art and not obvious. Moreover, absent Applicant's disclosure, reducing the radial internal clearance to provide consistent precessing is heretofore unknown.

Applicant has successfully demonstrated consistent precessing in a bearing apparatus 10 having a non-binding radial internal clearance B of no more than 0.002 inches. Moreover, Applicant has successfully demonstrated consistent precessing in two different bearing apparatuses having a radial internal clearance B of approximately 0.0016 inches and 0.0005 inches, respectively. Furthermore Applicant believes that a bearing apparatus 10 having a radial internal clearance B less than 0.0005 inches which does not cause the rollers 34 to bind will continue to consistently precess.

Figure 6:
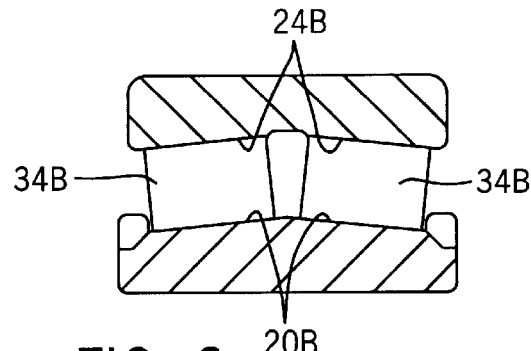
FIG. 6 is a sectional view of a bearing apparatus incorporating the present invention, and having two annular rows of outwardly axially inclined straight rollers.
Figure 7:
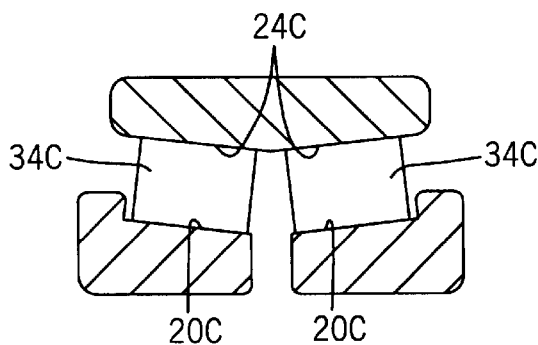
FIG. 7 is a sectional view of a bearing apparatus incorporating the present invention, and having two annular rows of inwardly axially inclined straight rollers with a split inner race.
Figure 8:
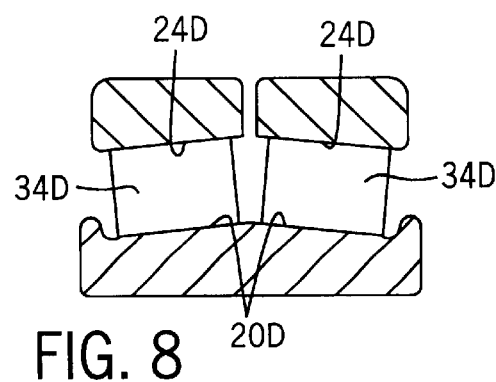
FIG. 8 is a sectional view of a bearing apparatus incorporating the present invention, and having two annular rows of outwardly axially inclined straight rollers with a split outer race.
Figure 10:
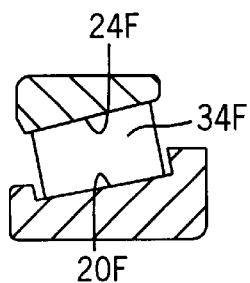
FIG. 10 is a sectional view of a bearing apparatus incorporating the present invention and having a single annular row of tapered rollers.
Figure 9:
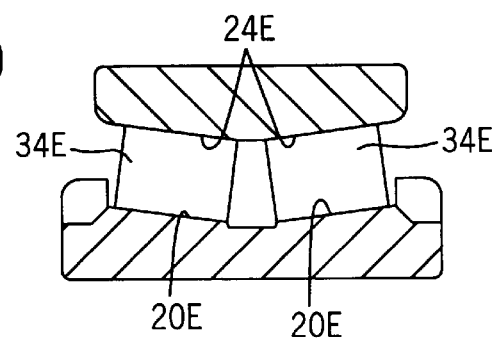
FIG. 9 is a sectional view of a bearing apparatus incorporating the present invention, and having two annular rows of inwardly axially inclined straight rollers.
Figure 11:
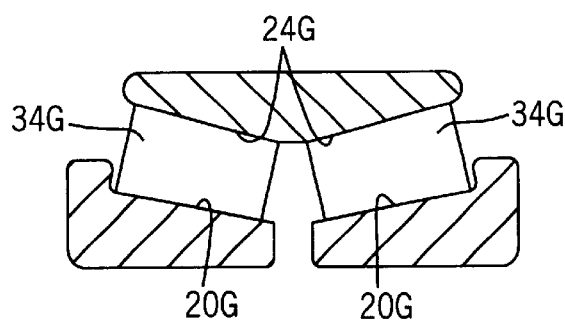
FIG. 11 is a sectional view of a bearing apparatus incorporating the present invention, and having two annular rows of inwardly axially inclined tapered rollers with a split inner race.
Figure 12:
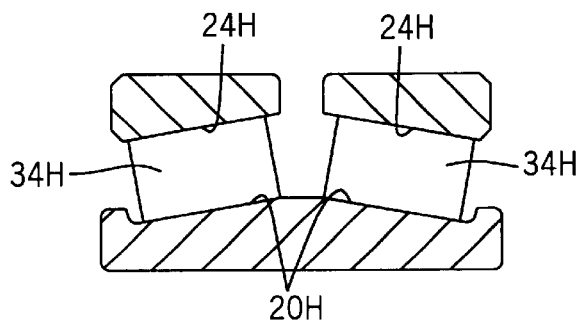
FIG. 12 is a sectional view of a bearing apparatus incorporating the present invention, and having two annular rows of outwardly axially inclined tapered rollers with a split outer race.
Figure 13:
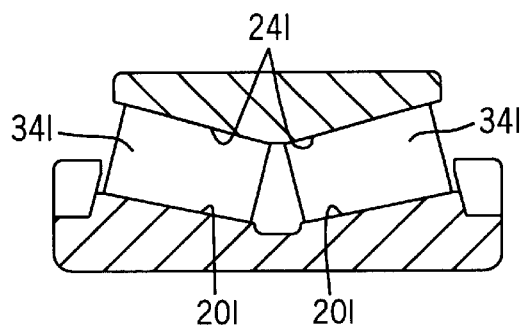
FIG. 13 is a sectional view of a bearing apparatus incorporating the present invention, and having two annular rows of inwardly axially inclined tapered rollers.

While in the illustrated embodiment the rollers 34 are hourglass-shaped, the outer race surfaces 24 are convex and the inner race surface is spheroidal, in other arrangements the bearing apparatus 10 can have different configurations. For example, a bearing apparatus in accordance with the invention can be an annular row of axially inclined straight (shown in FIGS. 5–9) or tapered (shown in FIGS. 10–13) rollers 34A–I and the inner and outer race surfaces 20A–I, 24A–I could each be axially inclined linear surfaces to accommodate the rollers 34A–I and to hold those rollers 34A–I in position with out the use of a retainer, guide ring, or the like. Moreover, a bearing apparatus 10 in accordance with the invention can have axially outwardly inclined rollers (shown in FIGS. 1, 6, 8) or axially inwardly inclined rollers (shown in FIGS. 7, 9, 11, and 13). In addition, although two annular rows of outwardly axially inclined rollers 34 are disclosed in FIG. 1, the bearing apparatus 10 can have one or more annular rows, and the rows can be inwardly axially inclined without departing from the scope of the present invention.

The bearing apparatus 10 also includes means for containing lubricant and for preventing contaminants from entering the raceway spaces 26. In the illustrated arrangement such means includes annular shield members 44 each seated in one of the notches 32, and an annular seal member 46 mounted in each of the shield members 44. Although shield members 44 having seal members are disclosed, they are not required to practice the invention.

Advantageously, the bearing apparatus 10 includes nothing to guide or position the rollers 34 and to control roller skewing other than the primary inner an outer race surfaces 20 and 24 (i.e., the bearing apparatus 10 is "retainerless"). Thus, the bearing apparatus 10 avoids the cost associated with retainers, guide rings, collars, and the like. Further, the bearing apparatus 10 avoids the use of internal corners associated with the primary race surfaces which is an advantage particularly in operating conditions which have particulate contamination. The bearing apparatus 10 also includes an increased number of rollers 34 and/or additional lubricant to improve performance, and has the ability to precess or index.

While there has been shown and described what are at present considered the preferred embodiments of the invention, it will be obvious to those skilled in the art that various changes and modifications can be made therein without departing from the scope of the invention defined by the appended claims.

I claim:
1. A retainerless roller bearing comprising:

an inner ring member including an inner race surface;
an outer ring member encircling the inner ring member and including an outer race surface opposing the inner race surface, and the inner and outer race surfaces defining therebetween a raceway space;
a plurality of rollers including at least one axially inclined row of rollers in the raceway space, each of the rollers in the row being engageable with the adjacent ones of the rollers in the row, wherein the radial internal clearance between each roller in said raceway space and said ring members is no more than 0.002 inches.

2. The retainerless roller bearing of claim 1, in which said inner race surface is an arcuate surface having a radius of curvature, said outer race surface is a convex arcuate surface having a radius of curvature, and each of the rollers in the row has a concave longitudinal profile and a radius, the radius of curvature of each of the rollers in the row being greater than the radius of each of the acuate inner and outer surfaces, and said radial internal clearance is measured at the longitudinal midpoint of each roller.

3. The retainerless roller bearing of claim 1, in which said rollers are selected from a group consisting of concave rollers, straight rollers, and tapered rollers.

4. The retainerless roller bearing of claim 1, in which the annular row of rollers is a full complement of rollers.

5. The retainerless roller bearing of claim 1, in which said plurality of rollers includes a pair of annular rows of axially inwardly inclined rollers.

6. The retainerless roller bearing of claim 1, in which said plurality of rollers includes a pair of annular rows of axially outwardly inclined rollers.

* * * * *

UNITED STATES PATENT AND TRADEMARK OFFICE
CERTIFICATE OF CORRECTION

PATENT NO. : 6,394,656 B1
DATED : May 28, 2002
INVENTOR(S) : Williams

It is certified that error appears in the above-identified patent and that said Letters Patent is hereby corrected as shown below:

Column 2,
Line 56, "fall" should be -- full --

Column 6,
Line 42, "comers" should be -- corners --

Signed and Sealed this

Twenty-third Day of July, 2002

Attest:

JAMES E. ROGAN
Attesting Officer      Director of the United States Patent and Trademark Office